Patented Feb. 8, 1927.

1,616,549

UNITED STATES PATENT OFFICE.

GEORGE L. PRICHARD AND HERBERT HENDERSON, OF PORT ARTHUR, TEXAS, ASSIGNORS TO GULF REFINING COMPANY, OF PITTSBURGH, PENNSYLVANIA, A CORPORATION OF TEXAS.

PROCESS OF MAKING ALUMINUM CHLORIDE.

No Drawing.   Application filed March 3, 1922. Serial No. 540,821.

This invention relates to the process of making aluminum chloride; and it comprises a method of producing aluminum chloride with the aid of bauxite, or other form of hydrated alumina, carbon and chlorin, wherein such bauxite, or other form of hydrated alumina, is freed from water of hydration and charged with adsorbed carbon prior to its contact with the chlorin by heating said bauxite with asphalt, such asphalt being at a dehydrating temperature, say around 450° F., the mixture being thereafter carbonized and then exposed to the action of chlorin; all as more fully hereinafter set forth and as claimed.

Alumina ($Al_2O_3$), carbon and chlorin at a high temperature enter into a reaction whereby aluminum chloride is formed, the oxygen of the alumina uniting with the carbon. The aluminum chloride formed goes off as vapor. While simple in principle, the operation is comparatively difficult to carry out in practice with a good yield. In part, these difficulties are inherent in the reaction itself. Looked at in one way, the reaction is that of two solid bodies upon each other and upon a gas simultaneously. Alumina and carbon, the solid bodies taking part in the reaction, are nonvolatile at any temperature here involved and the reaction must, in large measure, await the slow contact and action of solid on solid.

In practice, the bauxite and carbon are often finely ground together and briquetted. The finer the grinding of the two and the more intimate their association, other things being equal, the quicker the reaction goes forward.

In the present invention, we have devised a means of producing a particularly intimate association of alumina and carbon; an association which is practically molecular instead of being merely mechanical; and are enabled thereby materially to speed up reaction of the carbon and alumina with chlorin.

Bauxite is a natural hydrated form of alumina; it is alumina combined with water or moisture in the state known as water of hydration. On cautiously heating alumina, this combined water may be dissociated away or driven off; the action however being slow and generally requiring high temperatures for its completion. In a measure, time and temperature are reciprocal. Complete expulsion of the water is desirable prior to the use of the material for making aluminum chloride. In dehydrating or drying by heat, there is the difficulty that if the temperature be pushed beyond a certain point or if the heating be prolonged, the alumina shrinks or condenses and becomes chemically very much less reactive. Whether this be due to an increased density or compactness in structure, preventing the chlorin gas entering it intimately, or whether it is due to an actual diminution in chemical activity, may remain undecided. Probably both causes are operative.

In the present invention, in lieu of dehydrating the bauxite by heat and then admixing with carbon as is the usual practice, the roughly dried bauxite freed of sensible moisture but still containing its water of hydration is mixed with a good quality of asphalt at a temperature well above the boiling point of water; say, at 450° F. Asphaltic material such as "steam reduced" oil asphalt is a particularly suitable variety of asphalt. An asphalt with a fixed carbon content of about 23 per cent is satisfactory. Under the influence of the heat and of the asphalt, the chemically combined or adsorbed water (water of hydration) is removed and simultaneously replaced by asphalt; presumably in the same state of combination or adsorption as the water. This can be done without any shrinking or condensation or forfeiture of chemical reactivity of the bauxite. The mixture is next carbonized or coked; that is, it is heated to around a red heat to expel all volatile hydrocarbons. This leaves the bauxite thoroughly impregnated with carbon; the carbon being in adsorbed relation; in a state of molecular association.

Bauxite thus treated on exposure to chlorin, forms aluminum chloride vapors with exceptional readiness. The action of the chlorin is most complete and the yield of aluminum chloride per pound of bauxite is greater than can be obtained from bauxite dehydrated in other ways and physically mixed with refinery coke and the like prior to chlorination.

What we claim is:

1. In the manufacture of aluminum chloride from bauxite, carbon and chlorin, the process which comprises mixing hydrated bauxite with heavy hydrocarbon material of the nature of asphalt, said material being at a dehydrating temperature, then carbonizing the so-treated mixture and exposing to the action of chlorin.

2. In the manufacture of aluminum chloride from bauxite, carbon and chlorin, the process which comprises mixing hydrated bauxite with steam reduced oil asphalt at a temperature of about 450° F. to dehydrate said bauxite, carbonizing the mixture to charge said bauxite with carbon and thereafter contacting chlorin with the carbonized material.

3. In the manufacture of aluminum chloride from carbon chlorin and a hydrated form of alumina, the process which comprises mixing a hydrated form of alumina with asphaltic material at a temperature around 450° F. to dehydrate said alumina, carbonizing the mixture to charge said alumina with adsorbed carbon and then treating with chlorin to form aluminum chloride.

4. In the manufacture of aluminum chloride from bauxite, carbon and chlorin, the process which comprises mixing hydrated bauxite with asphaltic material at a temperature sufficient to effect substantial dehydration of the bauxite and then carbonizing the mixture and exposing to the action of chlorin.

In testimony whereof we have hereunto signed our names at Port Arthur, Texas, this 27th day of February, 1922.

GEORGE L. PRICHARD.
HERBERT HENDERSON.